US010699124B1

(12) United States Patent
Herzberg et al.

(10) Patent No.: US 10,699,124 B1
(45) Date of Patent: Jun. 30, 2020

(54) AUGMENTED REALITY CONTENT SELECTION AND DISPLAY BASED ON PRINTED OBJECTS HAVING SECURITY FEATURES

(71) Applicant: AR, LLC, Nassau (BS)

(72) Inventors: Stefan W. Herzberg, Nassau (BS); Megan Herzberg, Nassau (BS)

(73) Assignee: AR, LLC, Nassau (BS)

( * ) Notice: Subject to any disclaimer, the term of this patent is extended or adjusted under 35 U.S.C. 154(b) by 0 days.

(21) Appl. No.: 16/565,234

(22) Filed: Sep. 9, 2019

(51) Int. Cl.
*G06K 9/00* (2006.01)
*G06Q 30/02* (2012.01)

(52) U.S. Cl.
CPC ..... *G06K 9/00671* (2013.01); *G06K 9/00442* (2013.01); *G06Q 30/0251* (2013.01)

(58) Field of Classification Search
None
See application file for complete search history.

(56) References Cited

U.S. PATENT DOCUMENTS

| 2007/0041635 | A1* | 2/2007 | Dykes | G06T 9/004 382/166 |
| 2012/0092373 | A1* | 4/2012 | Ryu | G06T 19/006 345/633 |
| 2013/0210523 | A1* | 8/2013 | Arumugam | G07F 17/3255 463/31 |
| 2016/0209648 | A1* | 7/2016 | Haddick | G02B 27/0093 |
| 2019/0205933 | A1 | 7/2019 | Glaser et al. | |
| 2019/0238952 | A1 | 8/2019 | Boskovich | |
| 2019/0318186 | A1* | 10/2019 | Sergott | G02B 27/0176 |

OTHER PUBLICATIONS

Doush, Iyad Abu, et al., "Currency recognition using a smartphone: Comparison between color SIFT and gray scale SIFT algorithms," Journal of King Saud University—Computer and Information Sciences, 2017, vol. 29, pp. 484-492.
Hasanuzzaman, Faiz M., et al., "Robust and Effective Component-based Banknote Recognition by SURF Features," 20th Annual Wireless and Optical Communications Conference, Apr. 2011, 6 pages.
"New Dimensions for Your Everyday Life—The Future is Here!", https://snoopstar.com/1265-2/, retrieved Sep. 9, 2019, 4 pages.

* cited by examiner

*Primary Examiner* — YuJang Tswei
(74) *Attorney, Agent, or Firm* — Nixon & Vanderhye, P.C.

(57) ABSTRACT

Systems, methods and techniques for automatically recognizing two-dimensional real world objects with an augmented reality display device, and augmenting or enhancing the display of such real world objects by superimposing virtual images such as a still or video advertisement, a story or other virtual image presentation. In non-limiting embodiments, the real world object includes visible features including visible security features and a recognition process takes the visible security features into account when recognizing the object and/or displaying superimposed virtual images.

27 Claims, 14 Drawing Sheets

US 10,699,124 B1

AUGMENTED REALITY CONTENT SELECTION AND DISPLAY BASED ON PRINTED OBJECTS HAVING SECURITY FEATURES

CROSS-REFERENCE TO RELATED APPLICATIONS

None.

STATEMENT REGARDING FEDERALLY SPONSORED RESEARCH OR DEVELOPMENT

None.

BACKGROUND & SUMMARY

Augmented reality ("AR") is the real-time superimposition of artificial images onto real world images. This technology has been used for a variety of applications from handheld entertainment to heads-up displays on military jets. For example, a person using an augmented reality-enabled display device (e.g., a smartphone with an AR app or AR enabled glasses) while shopping can be shown virtual advertisements, sale announcements, pricing information etc. superimposed onto images of actual products they can purchase.

Because AR tends to drive higher levels of attention, one advantageous use of augmented reality is superimposing advertisements and/or purchasing information over product images. People who might ignore traditional electronic advertisements may pay attention to an AR advertisement.

DETAILED DESCRIPTION OF EXAMPLE NON-LIMITING EMBODIMENTS

This technology provides systems, methods and techniques for automatically recognizing two-dimensional real world objects with an augmented reality display device, and augmenting or enhancing the display of such real world objects by superimposing virtual images such as a still or video advertisement, a story or other virtual image presentation.

In non-limiting embodiments, the real world object includes visible features including visible security features and a recognition process that takes the visible security features into account when recognizing the object and/or displaying superimposed virtual images.

Figure 1A:
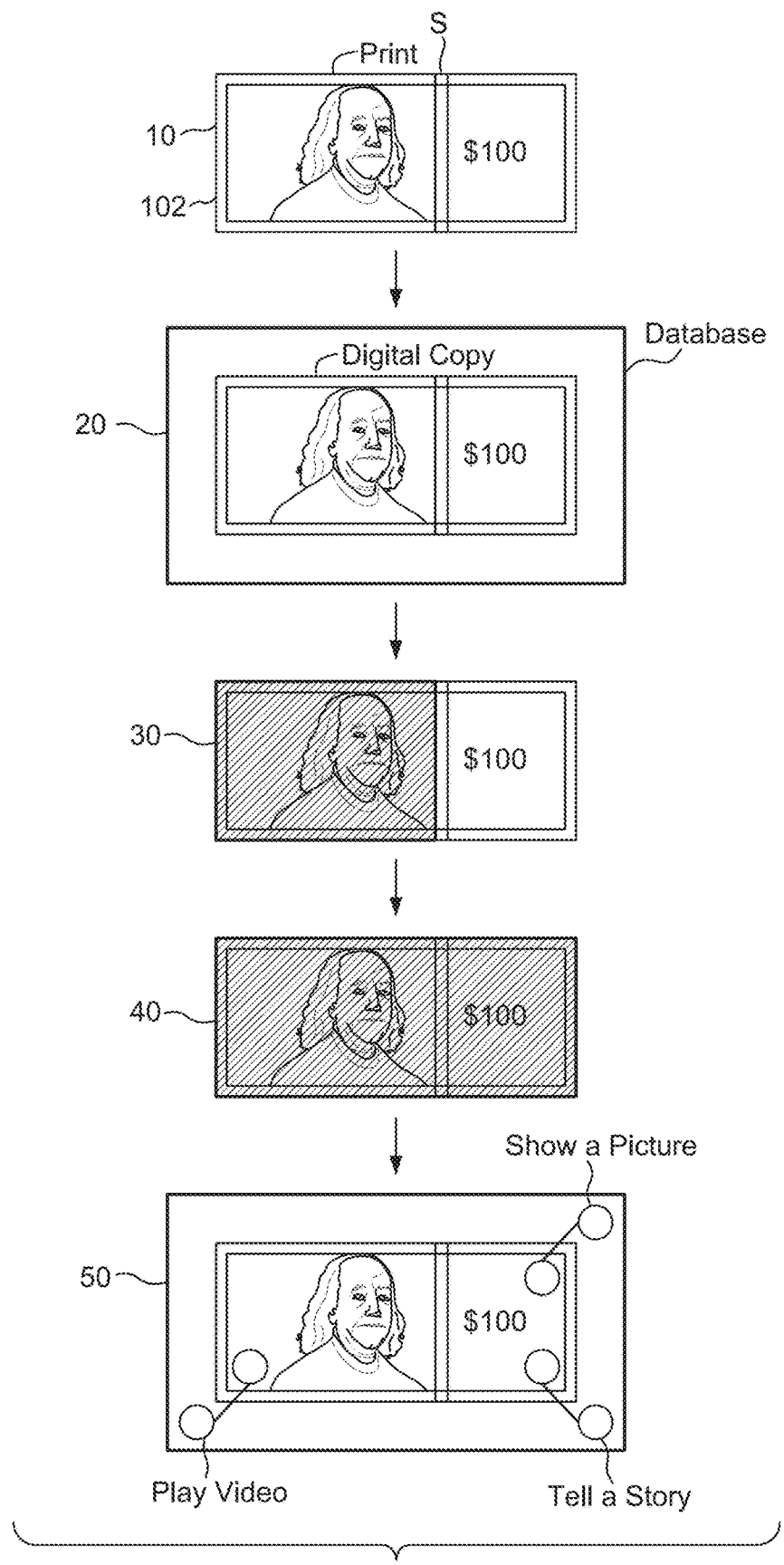
FIG. 1A is an example process flow diagram.
Figure 1B:
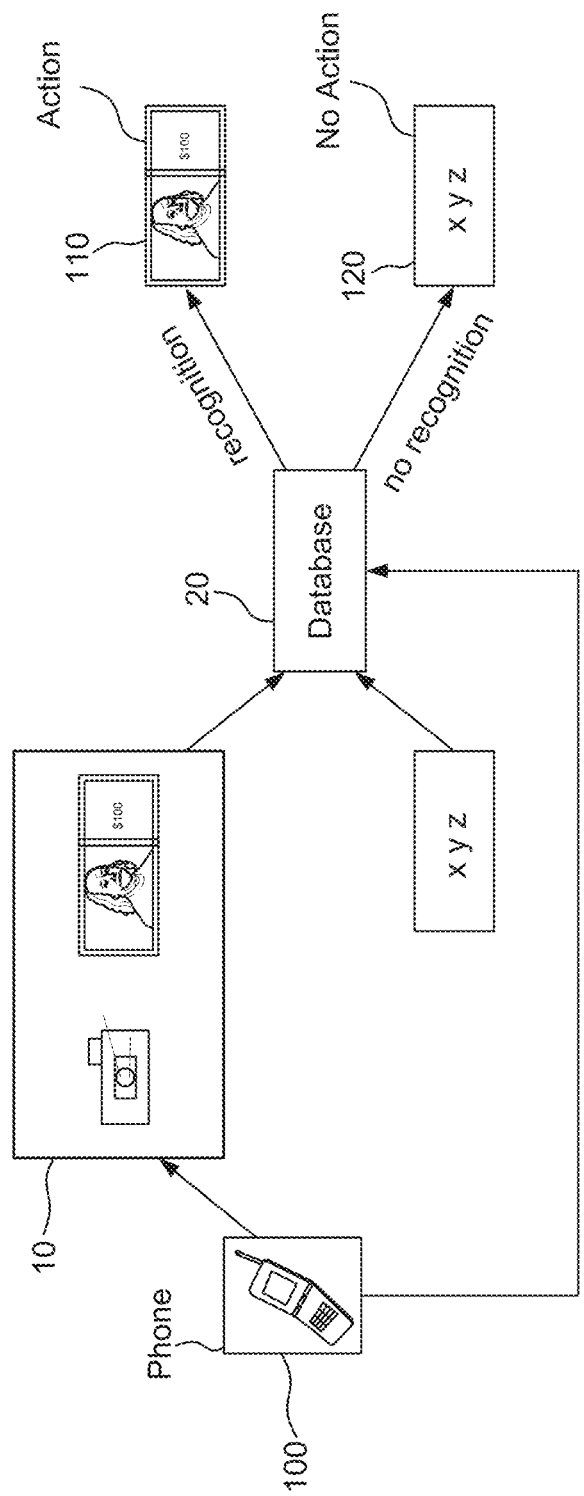
FIG. 1B shows an example branching process.

FIG. 1A shows an example non-limiting process. At 10, a printed, engraved, stamped or other object 102 such as a banknote, coin or ID (see FIGS. 2A-2J) is scanned to produce a digital copy. Such scanning can be performed with a camera, a CMOS light sensor, a document scanner, or any other conventional device that creates a digital image of the printed object.

The printed object may include visible features such as distinctive images of persons, buildings, etc. In the example shown, the printed object further includes an example visible security feature S represented here as a vertical band. The scanned digital copy will include the distinctive image(s) as well as the visible security feature S.

At 20, the resulting digital copy of the printed object is uploaded into a database, and enhanced to provide a selected associated overlay comprising: (a) self-starting video(s) and/or video(s) that starts when you press a button; (b) button(s) that when selected have different interactive functions such as "tell a story"; and (c) interactive connection to an online shopping experience e.g., to show a store finder (see 50). We can change the digital "overlay" quickly if needed (e.g., to change from one advertising campaign to another).

Within that overlay, we determine an "area of recognition" as indicated by a cross-hatched area (30). In one example embodiment, the area of recognition is determined at least in part by the presence, position, dimensions and/or orientation of one or more security features S. For example, the area of recognition may be defined to exclude the security feature S on the printed object. As an example, in the case of a 20 Euro note (see FIG. 2E) including a vertically-oriented silver holographic band which appears differently depending on the viewing angle, the "area of recognition" may be defined to exclude the silver holographic band so the system is able to recognize the object even without a silver line. Similarly, the area of recognition in the case of a $100 US banknote shown in FIG. 2C may be defined to exclude security features B, C and E since at least some of these features may appear differently depending on viewing angle (e.g., the ink color changes from gold to green as viewing angle changes). Other security features such as serial numbers, bar codes etc. vary from one printed document to another, so that using such indicia will result in no recognition of a banknote of the same denomination but having a different unique serial number and/or unique bar code (i.e., the purpose of the recognition may be to recognize a particular kind of banknote, not that specific one-of-a-kind banknote). Excluding such security features from the area of recognition makes recognition more robust because it is not subject to such constraints.

Figure 1C:
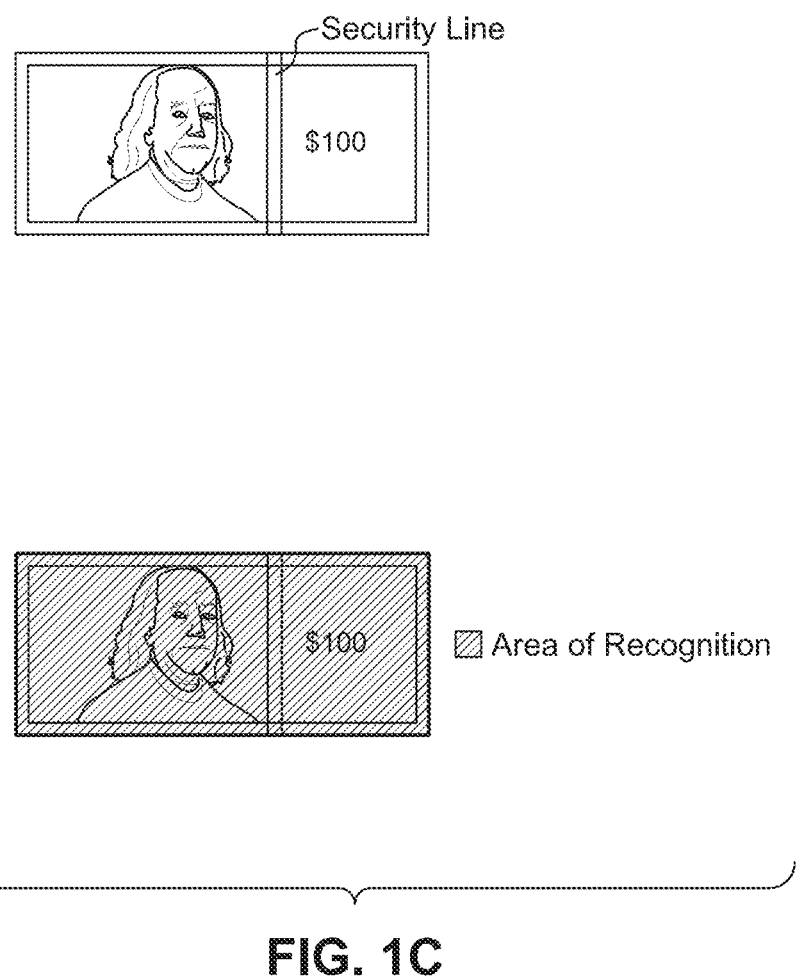
FIG. 1C shows an example area of recognition.
Figure 2A:
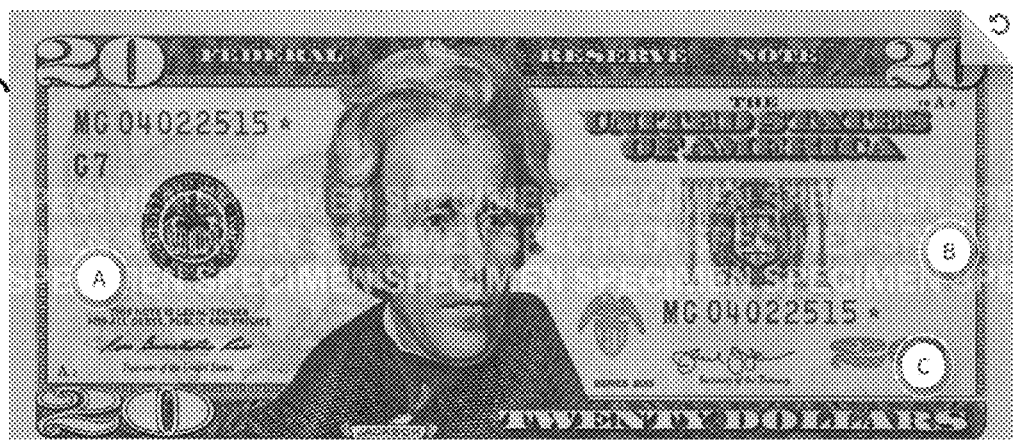
FIGS. 2A-2J show example items to be recognized.
Figure 2B:
Figure 2C:
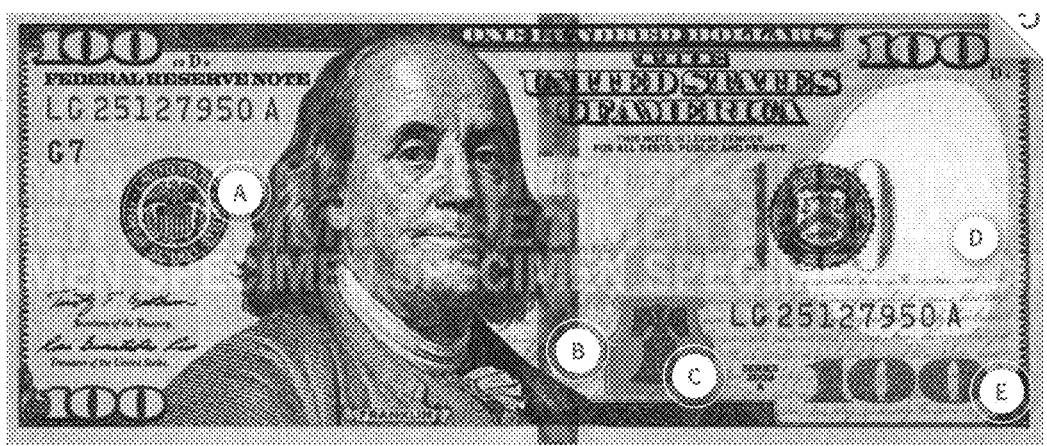
Figure 2D:
Figure 2E:
Figure 2F:
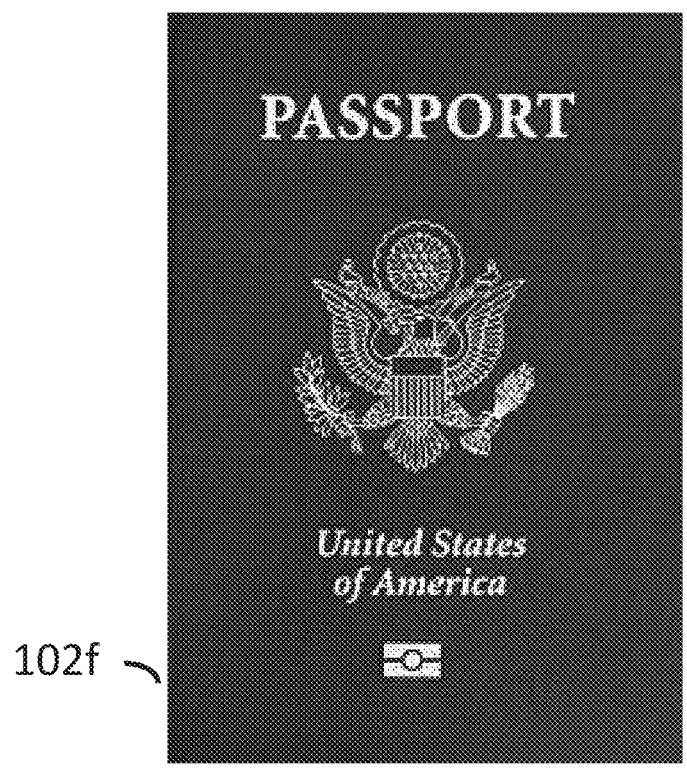
Figure 2G:
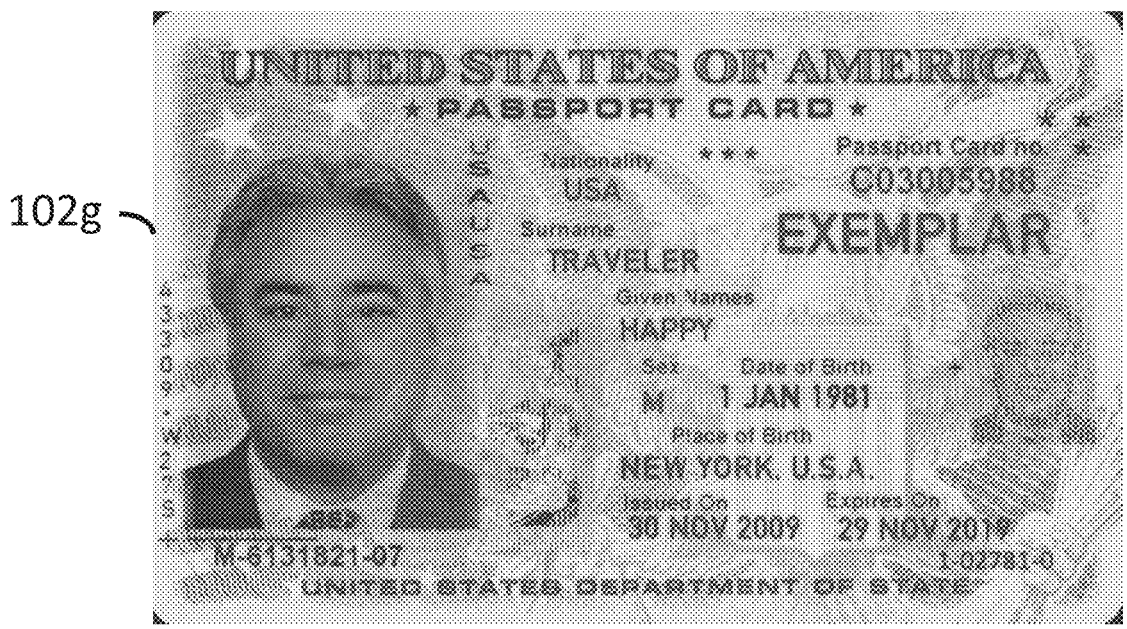
Figure 2H:
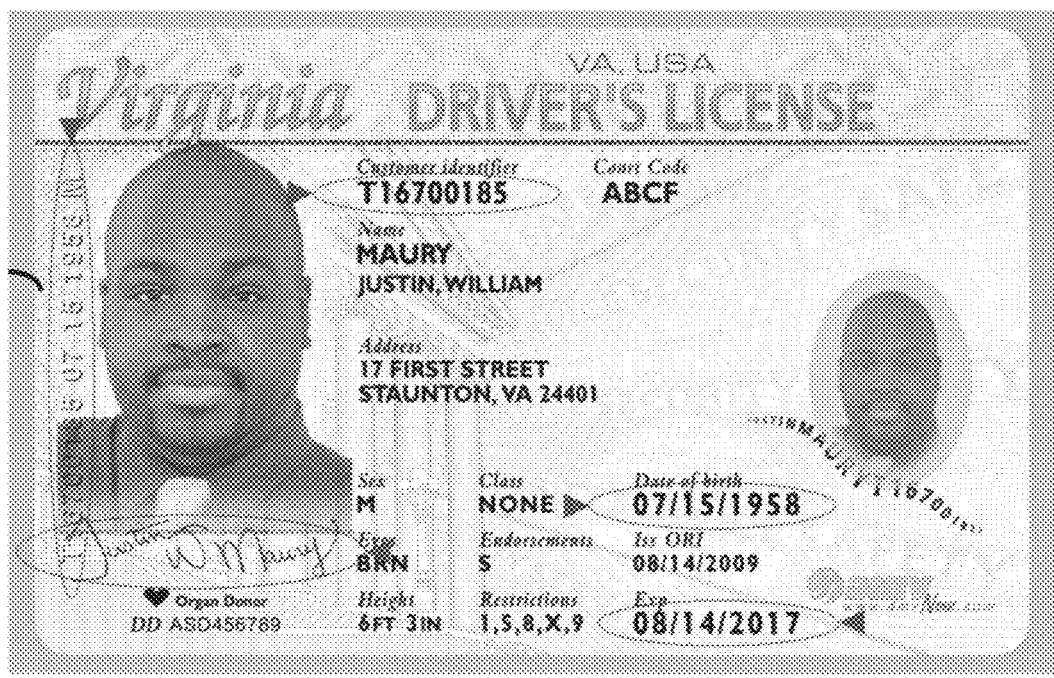
Figure 2I:
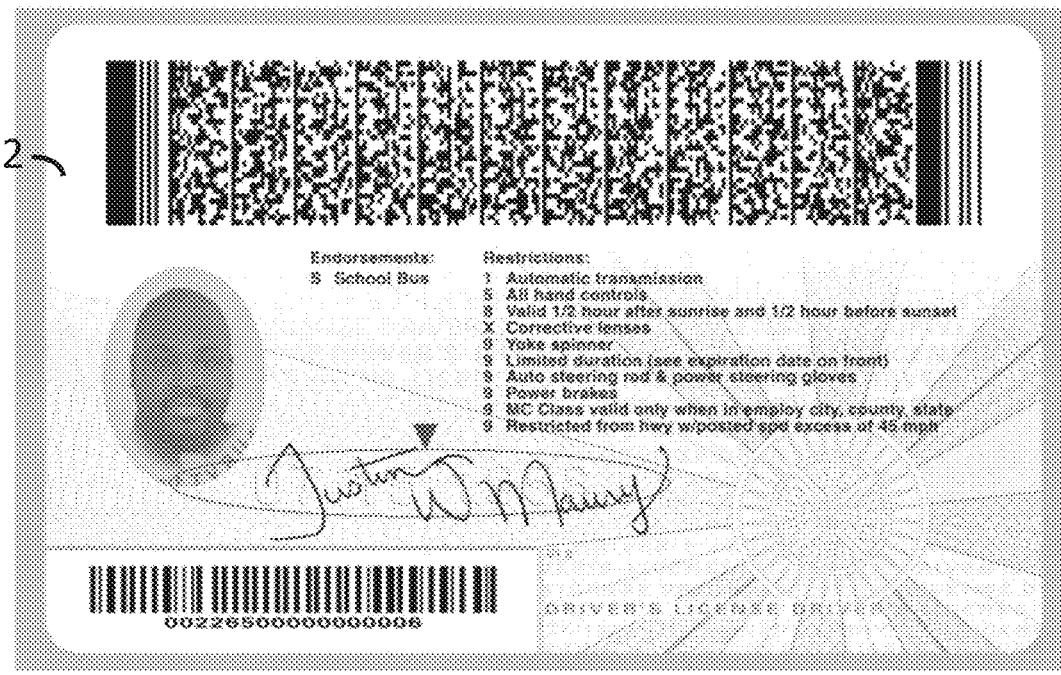
Figure 2J:

In another embodiment at 40, at least some security features S are included in the defined area of recognition. The object is recognized only if it includes the security feature(s). If there are visible security features, we can include them into our recognition program. When we upload the digital copy of a print, we can decide which area of the print is used for recognition. See FIG. 1C. When this area of recognition includes an example such as the silver line of a banknote, the note cannot be recognized when the silver line is missing. In this embodiment, the security feature S is used as a feature of recognition to increase the reliability of the recognition to recognize distinctive documents, while designing the recognition algorithm to take different viewing angles into account. For example, it is possible to include the position and orientation of a silver holographic band in an area of recognition without requiring the holographic contents of the band to be recognized. Similarly, it is possible to include the position of serial numbers or bar codes in an area of recognition without requiring the specific serial numbers or bar code contents to match.

Some embodiments provide plural overlapping areas of recognition for the same object; one area of recognition may exclude certain security features and another area of recognition includes those security features. The plural different overlapping areas of recognition can be applied sequentially or simultaneously to increase recognition reliability. A voting algorithm can be used to select positive matches.

In example non-limiting embodiments, the database enables real time recognition of an image captured by a user. For example, if the user captures an image of a 20 Euro note, a matching algorithm is used to determine a positive match if the database contains a digital copy of a 20 Euro note. In example non-limiting embodiments, the matching algorithm can include pattern recognition techniques such as described in Corvi et al, Multiresolution image registration, Proceedings., International Conference on Image Processing (IEEE 23-26 Oct. 1995); Hasanuzzaman et al, Robust and effective component-based banknote recognition by SURF features, 20th Annual Wireless and Optical Communications Conference (IEEE 15-16 Apr. 2011); Doush et al, Currency recognition using a smartphone: Comparison between color SIFT and gray scale SIFT algorithms, Journal of King Saud University—Computer and Information Sciences Volume 29, Issue 4, October 2017, Pages 484-492.

As will be understood by those skilled in the art, the database 20 could but need not contain the captured images themselves. For example, in some embodiments, the database might contain compressed or other feature sets used for comparing with captured photos, such feature sets for example comprising a listing of coordinates and associated image features to thereby reduce storage requirements and increase recognition speed. Similarly, when a smart device captures an image, instead of uploading the entire image it may analyze the image and upload a compressed format such as coordinates of pattern features. Since the purpose of recognition in the example non-limiting embodiment is not to determine whether the banknote or other printed item is authentic and genuine, the matching/recognition standards can be significantly relaxed and thus quite different as compared to conventional banknote scanners/recognizers.

Some example embodiments use artificial intelligence and machine learning to perform the matching. The training set consists of images captured by various smartphones and other user devices.

Figure 3:
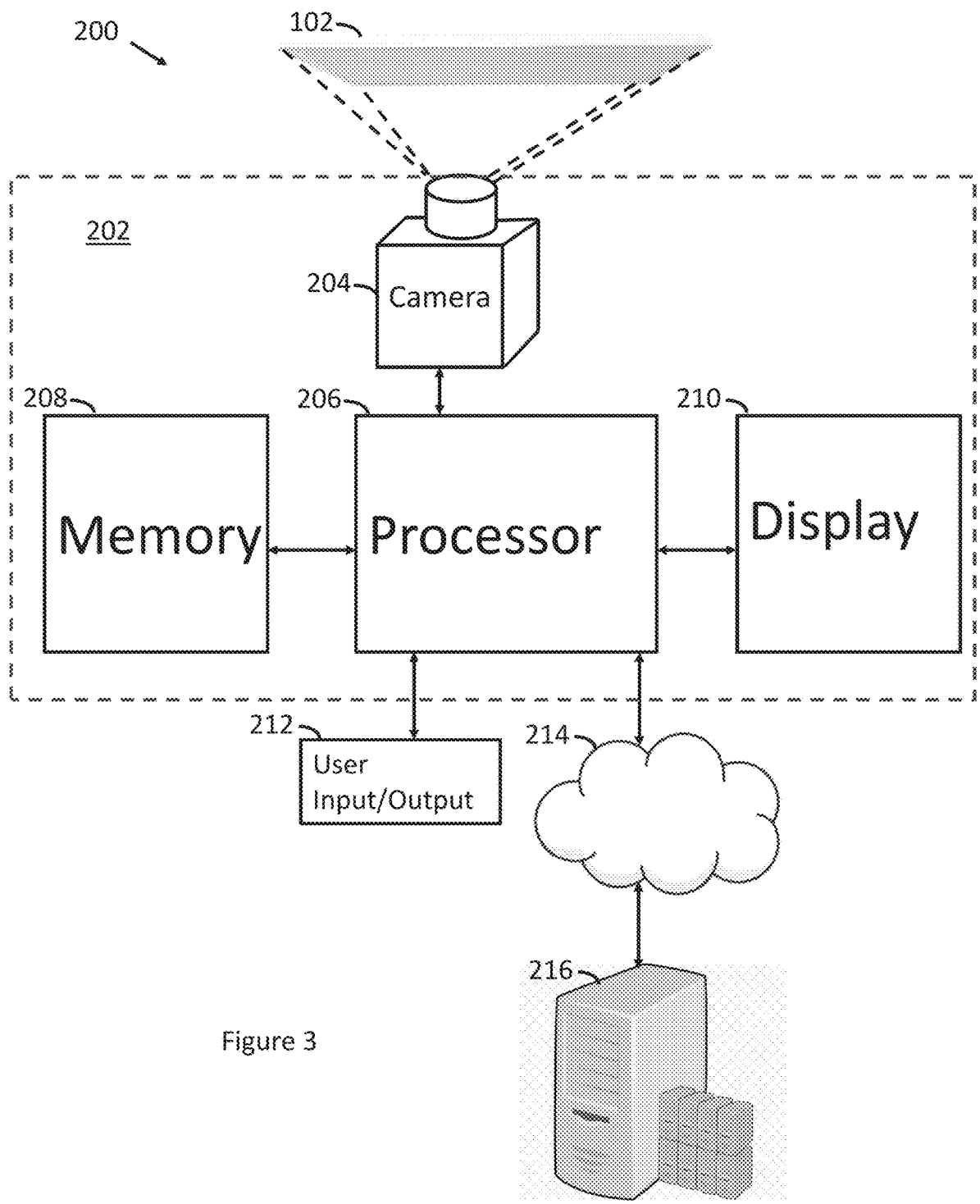
FIG. 3 shows an example block diagram of a smart device.

FIG. 3 shows an example non-limiting system 200 including a user device such as a smartphone 202 which includes a camera or CMOS sensor 204, a processor 206, a memory 208, a display 210 and user input/output devices 212 such as a touch screen, push buttons, etc. The processor 206 communicates wirelessly or through a wire via a network 214 with a server 216 which may store the database 20 and in some embodiments perform the image recognition. The app may comprise executable instructions that the device 202 downloads from the server 216, stores in memory 206, and executes in response to user selection of input/output devices 212.

Figure 4:
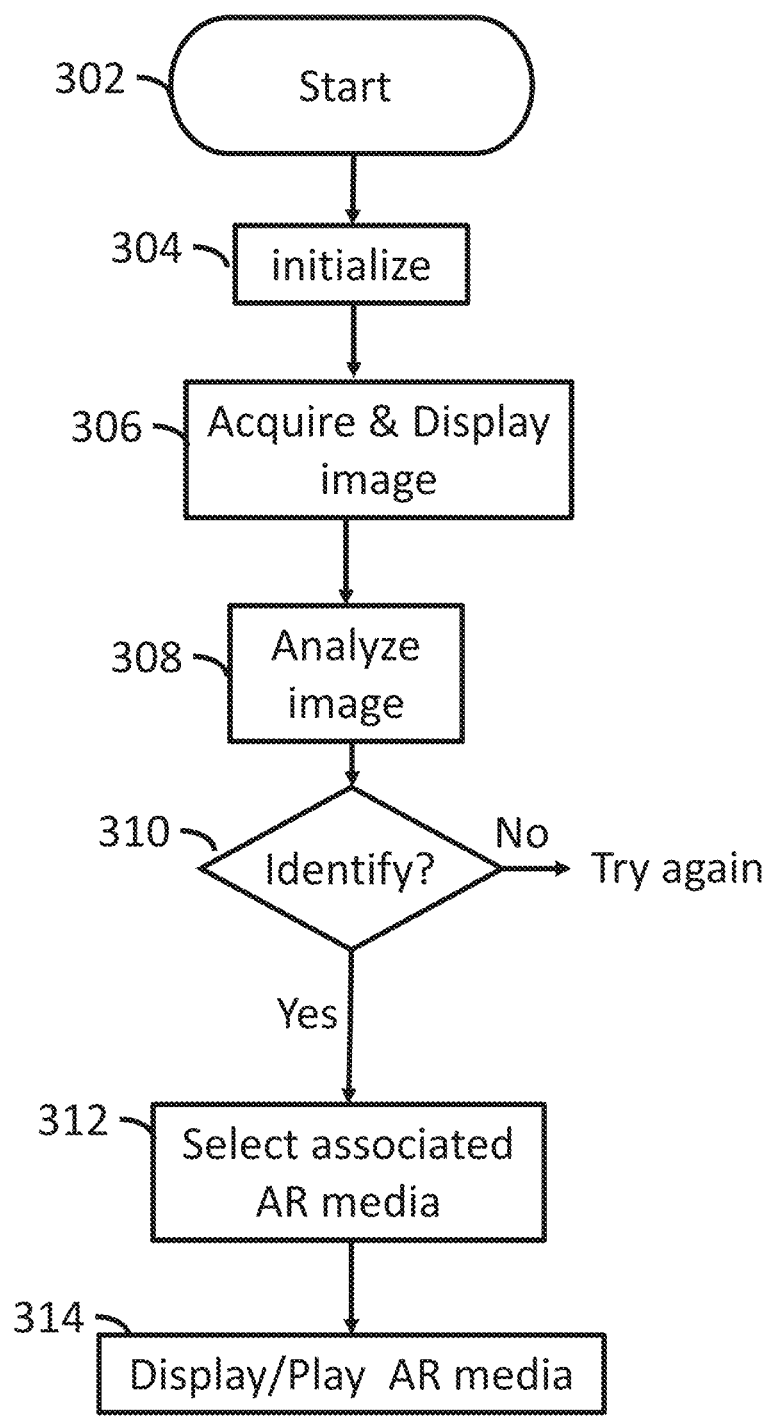
FIG. 4 shows an example non-limiting process flow diagram.

From a user perspective, as shown in FIG. 1A, after downloading an app onto their smart phone or other device 202, the customer can point the phone's camera onto a print or a digital copy on the screen of his tablet, computer, etc. (100; FIG. 4 blocks 302, 304, 306). This causes the device 202 to display a photographically captured image on display 210 (see FIG. 5A, 6A). It is possible in some embodiments for device 202 to obtain this captured image some other way than photographing an actual object 102, such as via network 214, e.g., by downloading the image through Instagram or other photo sharing service, by receiving the image via a text (SMS) message, by receiving the image from another device in proximity (e.g., using Bluetooth pairing, etc.) or by other means.

Once the app has been activated to recognize the captured image, the app connects with the database 20 on server 216 via network 214 and checks if this print is recognized (FIG. 4 blocks 308, 310). If recognition is successful (branch 110), an action is enabled (e.g., playing a video, telling a story and/or showing a picture) (FIG. 4, blocks 312, 314). If recognition is unsuccessful (branch to 120), no action is enabled or a different action ("xyz") may be performed instead.

In one non-limiting example, the app causes the smartphone 202 to show a picture or video by anchoring it to the image currently being captured by the smartphone camera 204 and displayed on the smartphone display 210. See FIG. 5B, 6B. If the user moves the smartphone slightly to change the position or orientation of the printed item on the smart phone's display 210, the picture or video will move with the image of the printed item on the display as if it were glued or otherwise adhered to the printed item or were being displayed by the printed item itself from a magic display window on the printed item. For example, the superimposed image can change position, orientation and/or perspective as the underlying real world object changes position, orientation and/or viewing angle in order to provide a photorealistic image in which the superimposed image appears to be part of the underlying real world image. See for example FIG. 6B. This augmented reality feature provides a sense of wonder or surprise that is designed to capture the attention of the user. Instead of appearing to be a "flat" advertisement, the picture or window appears to be much more interactive and interesting and thus captures the user's attention. The augmented reality image can be animated and can be accompanied by audio and/or tactile sensations as indicated in FIGS. 5A, 5B, 6A, 6B.

In more detail, a user can aim the camera of a smartphone or other electronic device at any two-dimensional real world object or a likeness of such an object. One example type of two-dimensional object could be a portable, wallet-sized planar object such as a banknote, drivers license, passport, or other official or unofficial identification document examples of which are shown in FIG. 2A-2I. Such objects may be made of paper, plastic and/or other materials, and may be rigid, flexible and/or foldable. They may be of standard sizes such as 2.61 inches wide and 6.14 inches long; 120 by 62 millimetres (4.7 in ×2.4 in) to 160 by 82 millimetres (6.3 in ×3.2 in); the ID-1 format size of 85.60× 53.98 mm (3⅜ in ×2⅛ in approx.) and rounded corners with a radius of 2.88-3.48 mm (about ⅛ in); ID-3 standard size of 125×88 mm (4.921×3.465 in); or other size. See for example ISO/IEC 7810:2003.

One example such object comprises a banknote such as a US dollar bill, US five dollar bill, US ten dollar bill, US twenty dollar bill (see FIG. 2A), US fifty dollar bill (see FIG. 2B), a US one-hundred dollar bill (see FIG. 2C), a 20 euro note (see FIG. 2D), a 50 euro note (see FIG. 2E), or any other currency banknote. Other example objects comprise official government-issued identification such as a government issued passport (see FIG. 2F), passport card (see FIG. 2G), drivers license (see FIG. 2H, 2I), coin (FIG. 2J) or other official or unofficial object.

Such two-dimensional objects as described above often are protected by any or all of the following visible security features:

- holograms such as portrait window(s)
- woven three-dimensional security ribbon(s)
- distinctive image pattern(s) such as the EURion constellation
- glossy stripe(s) that reveal additional information when viewed on an angle
- watermark(s)
- raised printing
- ultraviolet ink (which reveals additional image information when viewed under ultraviolet light)
- thermochromatic ink (the color of which is dependent on temperature)
- color changing or color shifting ink (the color changes depending on viewing angle)
- see through indicia with complementary front and obverse portions
- microprinting (high resolution printing)
- unique printing fonts
- embedded security threads
- perforations
- plastic, cotton fiber or other material matted or other textured surface(s)
- barcodes
- serial numbers
- foil stamps
- photographs including clear window photographs
- unique metal compositions (for coins) such as bi-coloration
- other.

Example non-limiting recognition processes as described above can exclude such security features, or may take them into account or use them as part of the recognition process. However, since the purpose of the recognition is not to authenticate the photographed item as being genuine, the recognition/matching algorithm is quite different from ones that are used for banknote or ID authentication. In example non-limiting embodiments for example, it is desirable that matching occurs based on photographing a copy (e.g., displayed on a tablet screen or the like) and not just an original of a banknote, ID or the like. Thus, the matching will achieve positive results based on counterfeit (inauthentic) banknotes or IDs. However, the matching/recognition is robust in being able to detect different banknote denominations (e.g., 10 euro note versus 20 euro note versus $100 US bill etc.) and thus provide different overlays depending on which banknote is recognized.

In still other embodiments, the two-dimensional object could comprise a political campaign poster, billboard, flyer or other printed material and the overlay could provide a campaign song, slogan, speech, story, video or other content.

In example embodiments herein, the two-dimensional object is not (and does not need to contain) a so-called "AR marker" or 2D bar code and is otherwise not specially designed or intended to be recognized by an augmented reality display device.

Example 1

Figure 5A:
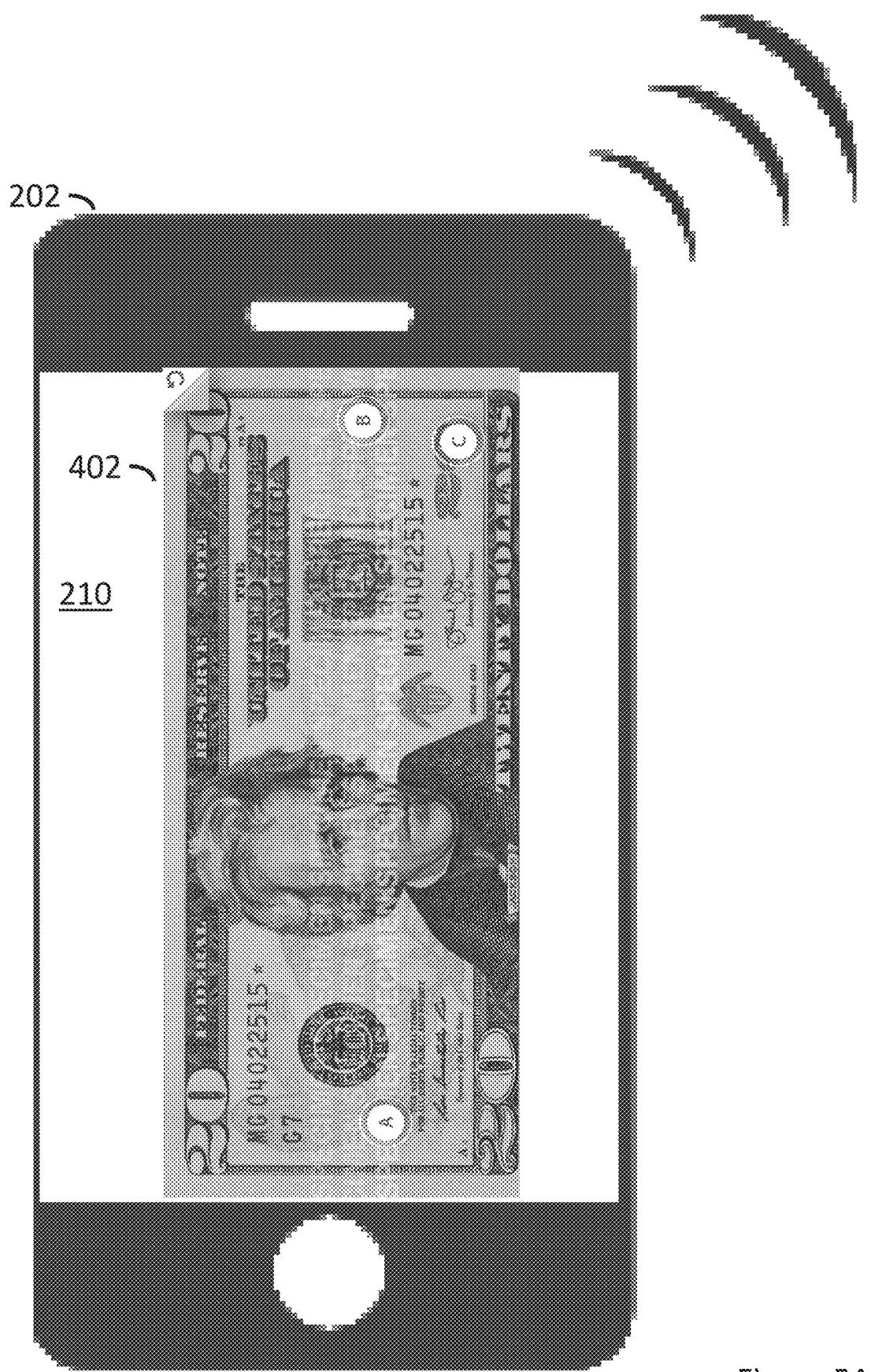
FIG. 5A shows an example capture of an image on a smart device.
Figure 5B:
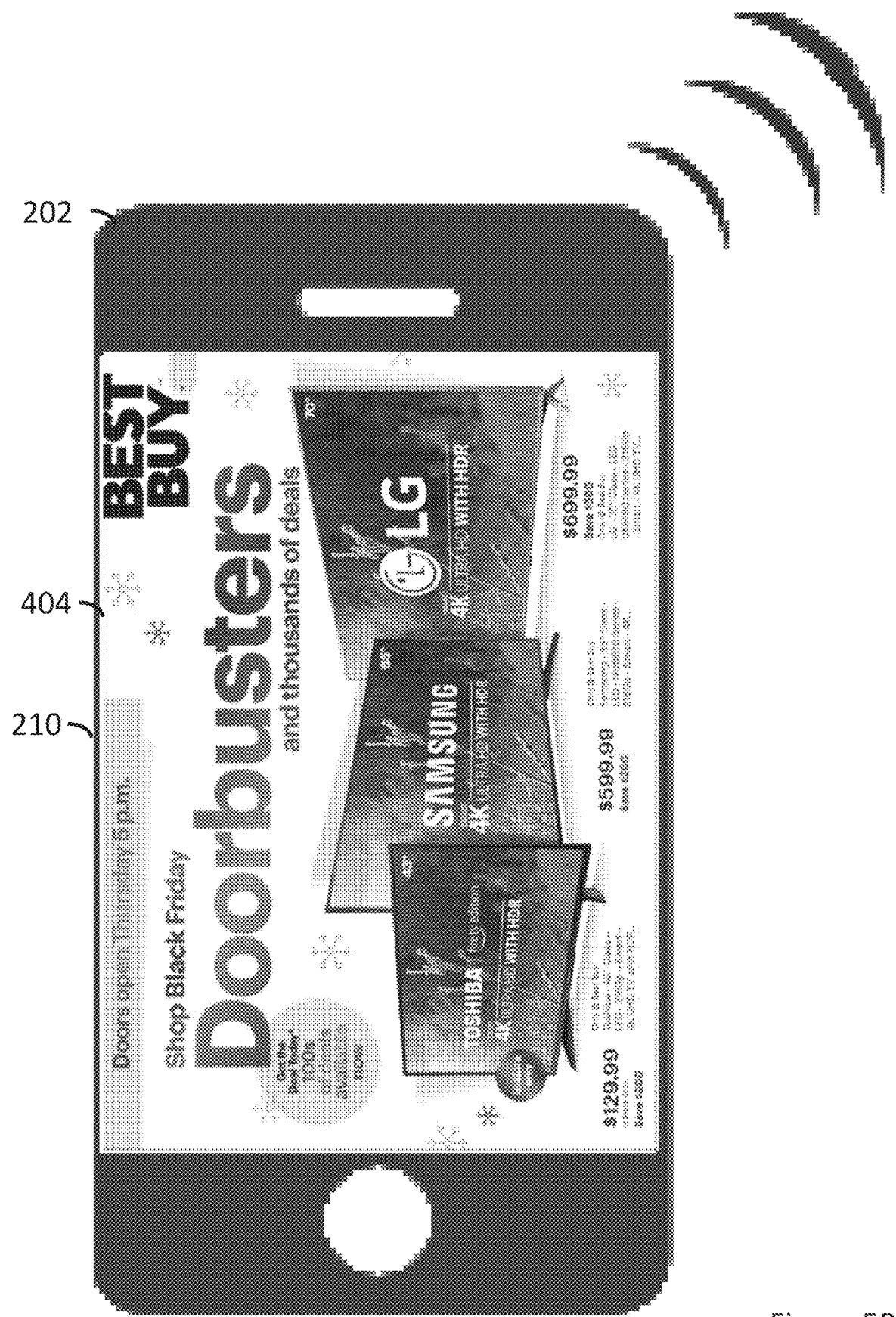
FIG. 5B shows an example augmented reality image superimposing a virtual image onto the FIG. 5A image capture.

FIG. 5A shows a smart device 202 the camera of which has captured an image of a $20 bill. Once the app recognizes the captured image 402 as described above, it displays a corresponding advertisement 404 as shown in FIG. 5B. The advertisement may be superimposed over the captured image 402.

Example 2

Figure 6A:
FIG. 6A shows an example capture of an image on a smart device.
Figure 6B:
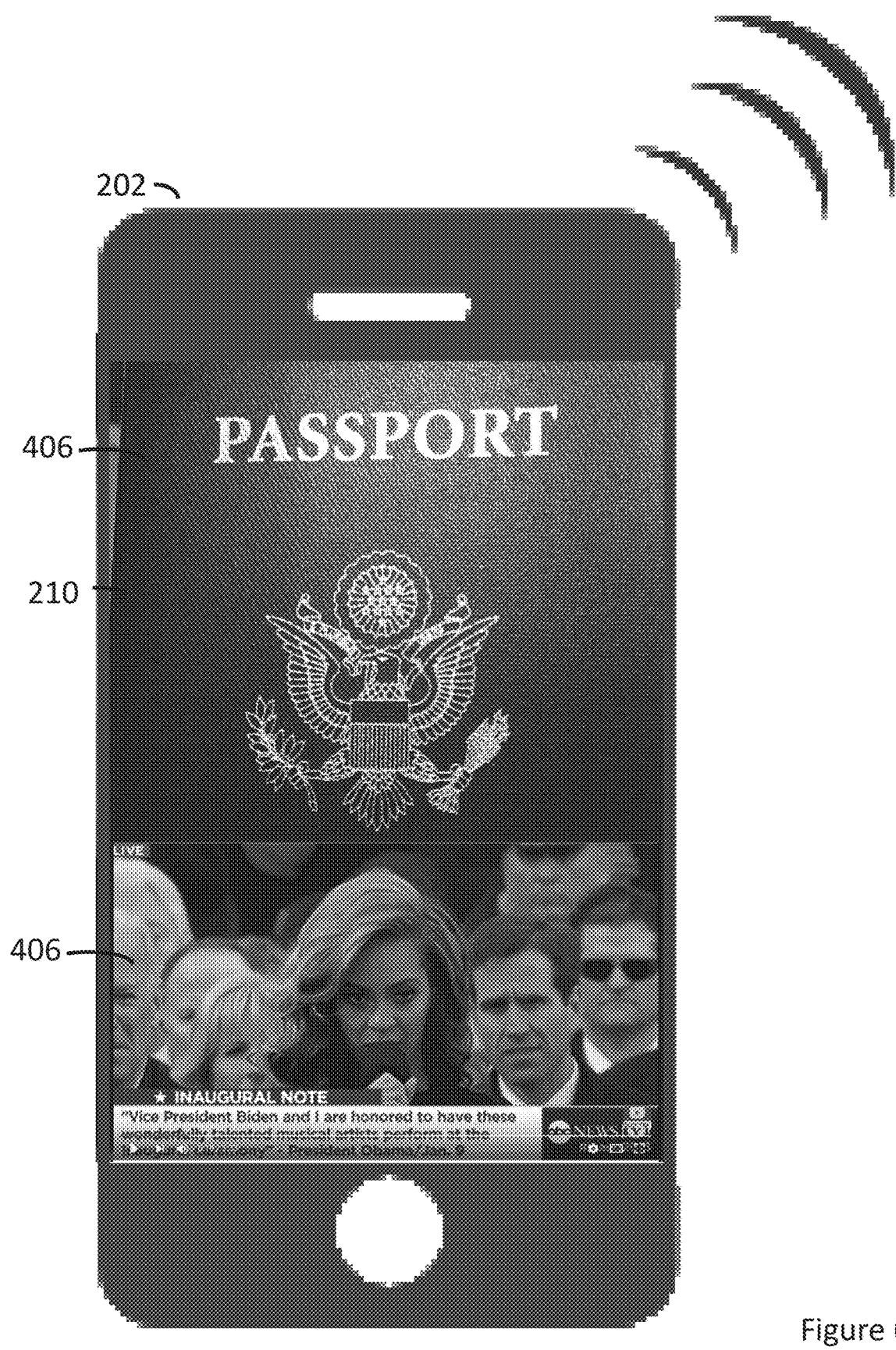
FIG. 6B shows an example augmented reality image superimposing a virtual image onto the FIG. 5A image capture.

FIG. 6A shows a smart device 202 the camera of which has captured an image of a US passport. Once the app recognizes the captured image 406 as described above, it displays a corresponding video 408 (as shown in FIG. 6B) that is superimposed onto the captured image 406. If the user rotates the smart device 202 to change the displayed position and/or orientation of the captured image 406, the corresponding video 408 will also change its position and/or orientation by the same amount. In some embodiments, the video 408 may be displayed with controls such as play/stop, fast-forward, rewind and mute that the user can press on the touch screen display 210 to allow the user to control playback of the video and/or accompanying audio.

Example 3

Instead of a video, FIG. 6B could display a superimposed control bar that allows the user to play an audio story associated with the captured image 406.

All printed publications cited above (including the ones shown in FIGS. 2A-2J) are hereby incorporated by reference as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of presenting image information to a user comprising:
    enabling capture of an image of a printed item including at least one visible security feature encoding a value;
    displaying the captured image;
    recognizing the captured image using at least one of color and grey scale information within the captured image wherein the recognizing does not require recognizing the value encoded by the at least one visible security feature;
    selecting a media item based at least in part on the recognition; and
    using augmented reality to superimpose the selected media item onto the displayed image as if it were part of the printed item,
    wherein the enabling capture comprises downloading the image from social media over a digital network.

2. The method of claim 1 wherein the recognizing comprises recognizing the image within a predefined recognition area that excludes the at least one visible security feature.

3. The method of claim 1 wherein the recognizing comprises recognizing the image within a predefined recognition area that includes the at least one visible security feature.

4. The method of claim 1 wherein the recognizing takes the at least one visible security feature into account but not the value the at least one visible security feature encodes.

5. A method of presenting image information to a user comprising:
    enabling capture of an image of a printed item including at least one visible security feature encoding a value;
    displaying the captured image;

recognizing the captured image using at least one of color and grey scale information within the captured image wherein the recognizing does not require recognizing the value encoded by the at least one visible security feature;

selecting a media item based at least in part on the recognition; and using augmented reality to superimpose the selected media item onto the displayed image as if it were part of the printed item, wherein the printed item comprises a banknote or other government issued document, and the at least one visible security feature includes at least three items selected from the group consisting of holograms, woven three-dimensional security ribbon(s), distinctive image pattern(s) such as the EURion constellation, glossy stripe(s) that reveal additional information when viewed on an angle, watermark(s), raised printing, ultraviolet ink which reveals additional image information when viewed under ultraviolet light, thermochromatic ink the color of which is dependent on temperature, color changing or color shifting ink, see through indicia with complementary front and obverse portions, microprinting, unique printing fonts, embedded security threads, perforations, plastic, cotton fiber or other material matted or other textured surface(s), foil stamps, photographs including clear window photographs, serial numbers and barcodes.

6. A method of providing a political message comprising:
pointing a camera at a billboard, flyer or other representation of a political campaign;
capturing and displaying an image;
uploading indicia of the captured image to a server;
recognizing the billboard, flyer or other representation of the political campaign based on the uploaded indicia; and
providing an augmented reality overlay for the displayed image, the overlay providing a message associated with the political campaign.

7. The method of claim 6 wherein the camera is disposed on a wireless wearable display device comprising a wearable display, the displaying displays the captured image on the wearable display, and the providing provides an augmented reality display on the wearable display.

8. The method of claim 7 wherein the wearable display device comprises wirelessly-connected augmented reality enabled glasses.

9. The method of claim 6 wherein the recognizing comprises recognizing a predefined recognition area using at least one color and grey scale information.

10. The method of claim 6 wherein uploading indicia comprises uploading a compressed format including coordinates of pattern features.

11. A system for presenting image information to a user comprising:
enabling a smart device to capture an image of a printed item including at least one visible security feature encoding a value and to display the captured image;
at least one processor configured to recognize the captured image based on at least one of color and grey scale information wherein the recognition does not require recognizing the encoded value; and
in response to the recognized captured image, enabling the smart device to use augmented reality to superimpose a media item selected based at least in part on the recognized captured image onto the displayed image as if it were part of the printed item, wherein the printed item comprises a banknote or other government issued document, and the at least one visible security feature includes at least three items selected from the group consisting of holograms, woven three-dimensional security ribbon(s), distinctive image pattern(s) such as the EURion constellation, glossy stripe(s) that reveal additional information when viewed on an angle, watermark(s), raised printing, ultraviolet ink which reveals additional image information when viewed under ultraviolet light, thermochromatic ink the color of which is dependent on temperature, color changing or color shifting ink, see through indicia with complementary front and obverse portions, microprinting, unique printing fonts, embedded security threads, perforations, plastic, cotton fiber or other material matted or other textured surface(s), foil stamps, photographs including clear window photographs, serial numbers and barcodes.

12. The system of claim 11 wherein the recognizing comprises recognizing the image within a predefined recognition area that excludes the at least one visible security feature.

13. The system of claim 11 wherein the recognizing comprises recognizing the image within a predefined recognition area that includes the at least one visible security feature.

14. The system of claim 11 wherein the recognizing takes the visible security feature into account but not the value the at least one visible security feature encodes.

15. The system of claim 11 wherein the smart device comprises a handheld device.

16. The system of claim 11 wherein the smart device comprises a wearable device.

17. A method of operating a portable or handheld display device comprising:
in response to capture and/or display of an image, initiating an operation to recognize the image based on at least one of color and grey scale information, the operation to recognize not requiring recognition of an encoded security value within the image;
upon recognition of the image, displaying a virtual media item superimposed onto the image, the media item including controls that enable a user to control at least some aspects of presentation of the media item; and
recognizing denomination of a banknote without requiring recognition of a serial number of the banknote.

18. The method of claim 17 wherein the controls enable the user to control video playback sequence.

19. The method of claim 17 wherein the controls enable the user to control audio playback.

20. The method of claim 17 wherein upon the user controlling the display device to capture and/or display a changed perspective of the image, the superimposing controls the display device to display the virtual media item from the changed perspective.

21. The method of claim 17 further including selecting the media item based on recognizing a predefined recognition area of the image.

22. The method of claim 17 wherein the image of the banknote is an image of a copy of the banknote.

23. The method of claim 17 wherein the banknote comprises a counterfeit or specimen of a banknote.

24. The method of claim 17 wherein the banknote comprises an inauthentic banknote.

25. The method of claim 17 wherein the display device comprises a smartphone.

26. The method of claim 17 wherein the display device comprises augmented reality enabled glasses.

27. A system for presenting image information to a user comprising:
- enabling a smart device to capture an image of a printed item including at least one visible security feature encoding a value and to display the captured image;
- at least one processor configured to recognize the captured image based on at least one of color and grey scale information wherein the recognition does not require recognizing the encoded value; and
- in response to the recognized captured image, enabling the smart device to use augmented reality to superimpose a media item selected based at least in part on the recognized captured image onto the displayed image as if it were part of the printed item,
- wherein the smart device comprises a wearable device,
- wherein the wearable device comprises wirelessly-connected augmented reality enabled glasses.

\* \* \* \* \*